United States Patent
James et al.

(10) Patent No.: US 6,959,289 B1
(45) Date of Patent: Oct. 25, 2005

(54) DIGITAL RIGHTS FRAMEWORK (75) Inventors: Arthur James, San Jose, CA (US); Michelle Brent, San Jose, CA (US); Peter P. Corless, Mountain View, CA (US); Sanjay Khera, San Jose, CA (US); Soyoung Park, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/569,095

(22) Filed: May 10, 2000

(51) Int. Cl.$^7$ .............................................. G06F 17/60
(52) U.S. Cl. ........................ 705/51; 705/1; 713/201; 713/168; 709/250; 709/229; 709/232
(58) Field of Search ................... 705/51, 1; 709/229, 709/232, 250; 713/168, 201

(56) References Cited

U.S. PATENT DOCUMENTS

| | | | |
|---|---|---|---|
| 5,715,403 A | * 2/1998 | Stefik | 705/44 |
| 5,765,152 A | 6/1998 | Erickson et al. | 707/9 |
| 5,892,900 A | 4/1999 | Ginter et al. | 395/186 |
| 5,905,860 A | 5/1999 | Olsen et al. | 395/187.01 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,943,422 A | 8/1999 | Van Wie et al. | 380/9 |
| 5,949,876 A | 9/1999 | Ginter et al. | 380/4 |
| 5,982,891 A | 11/1999 | Ginter et al. | 380/4 |
| 5,991,876 A | 11/1999 | Johnson et al. | 713/200 |
| 6,006,332 A | * 12/1999 | Rabne et al. | 713/201 |
| 6,044,466 A | 3/2000 | Anand et al. | 713/200 |
| 6,061,726 A | 5/2000 | Cook et al. | 709/226 |
| 6,282,573 B1 | * 8/2001 | Darago et al. | 709/229 |

FOREIGN PATENT DOCUMENTS

| | | | |
|---|---|---|---|
| EP | 0927921 A2 | 7/1999 | G06F/1/00 |
| JP | 02003263484 A | * 3/2002 | G06F/17/60 |

OTHER PUBLICATIONS

Agreement on trade related aspects of intellectual proopert rights.*

* cited by examiner

Primary Examiner—James P. Trammell
Assistant Examiner—John Winter (57) ABSTRACT

A method and system thereof for establishing legal rights and limitations regarding the use of electronically distributed intellectual property (e.g., a "digital rights framework"). The intellectual property is modeled and offered for different types of distribution (e.g., for sale, rent, etc.). In response to a request for access to and use of the intellectual property, the legal rights and limitations associated with the type of distribution requested are provided. For example, a hypertext reference can be used to invoke the legal rights and limitations associated with the type of distribution. An agreement to these legal rights and limitations is reached and executed, and stored for subsequent reference and use. The digital rights framework provides a method and system for processing information encoded in a standardized and extensible format (e.g., Extensible Markup Language, XML) for modeling and representing the legal rights, limitations and responsibilities for intellectual properties distributed, for example, over the World Wide Web using Internet Protocol.

36 Claims, 6 Drawing Sheets

DIGITAL RIGHTS FRAMEWORK

TECHNICAL FIELD

The present invention relates to the electronic transfer of information, particularly intellectual property, over computer system networks. More specifically, the present invention pertains to the control and regulation of the distribution of intellectual properties over the Internet.

BACKGROUND ART

Intellectual property can be considered in terms of either its "embodiments" or its "representations." Generally, an embodiment of an intellectual property is the property itself, while a representation of the intellectual property can be data or meta-data either describing or pointing to the property.

For example, intellectual properties such as real-time human communications, stored and forwarded messages, documents or collections, dynamic or persistent data structures and databases, interpretable scripts, source code, and partially or fully compiled programs and applications, as well as other intellectual properties generally referred to as "content," are often described as an embodiment of the intellectual property. Embodiments of intellectual property can also be theoretical or abstract concepts which are exemplified, documented or reified as a specific form of content.

Legal rights, contracts, agreements or other assertions can be embodied in the form of content, but are not the embodiment of the intellectual property itself. Instead, these are considered representations of the intellectual property. Some Intellectual properties, such as a deed or title to a home, can be representations of physical or real properties.

Intellectual properties are becoming more and more central to the world economy. In an information economy, discrete or aggregate values are placed on intellectual properties, and the markets for general or specific applications of these properties are huge. For example, the software industry, which has embodiments of intellectual properties in software products and services, and representations of property rights in licenses, legal contracts and agreements, copyrights, trademarks and patents, currently has annual sales rates of over $135 billion per year.

Increasingly, the Internet (or World Wide Web) is the medium of transmission of intellectual properties such as software products and the like. The Internet uses the Internet Protocol to frame, route, and reassemble digital messages. The transaction of intellectual property is a general transfer of data and data communications over the Internet; intellectual property such as software is simply treated as a bit stream in Internet Protocol. On top of the Internet Protocol are specialized transport layer services, such as HTTP (Hypertext Transfer Protocol) or SMTP (Simple Mail Transfer Protocol). Within these, many messages are encoded in markup languages such as XML (Extensible Markup Language), the World Wide Web Consortium (W3C) meta-markup language based on SGML (Standard Generalized Markup Language).

With regard to the protection of intellectual property, the prior art takes a defensive posture that is focused on guarding the intellectual property against unauthorized access, duplication and use. Limitations are placed on the use and distribution of a piece of intellectual property, and various means are used to attempt to enforce these limitations. Oftentimes, the limitations can be easily circumvented, and so enforcement can be difficult and therefore is mostly ineffective.

In addition, while in some cases the prior art may take advantage of the Internet for delivery of intellectual property such as software, the prior art is still encumbered by more traditional mechanisms for conducting the legal and commercial aspects of intellectual property transactions. For example, purchase orders, terms and conditions, license agreements and the like must be negotiated, written, reviewed and approved. These more traditional mechanisms can cause delay in the delivery and use of the intellectual property by a purchaser or licensee, and delay in the receipt of payments or royalties due to a seller or licensor.

What is needed is a method and system thereof for controlling the identification, negotiation, establishment, and transaction of intellectual properties (embodiments and representations) over the Internet (e.g., an "IP over IP framework"). What is also needed is a method and/or system that can satisfy the above need and can model and assert information regarding the rights, responsibilities and other terms of use of intellectual property within the IP over IP framework. What is further needed is a method and/or system that can satisfy the above needs, and can allow interrogation of that information and can respond to those interrogations. In addition, what is needed is a method and/or system that can satisfy the above needs and can allow for storage and transport of the information regarding the rights, responsibilities and other terms of use of intellectual property. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method and system for controlling the Identification, negotiation, establishment, and transaction of intellectual properties (embodiments and representations) over the Internet (e.g., an "IP over IP framework"). The present invention also provides a method and system for modeling and asserting information regarding the rights, responsibilities and other terms of use of intellectual property within the IP over IP framework. The present invention also provides a method and system that allow interrogation of that information and that respond to those interrogations. The present invention further provides a method and system that allow for storage and transport of the information regarding the rights, responsibilities and other terms of use of intellectual property.

The present embodiment of the present invention provides a method and system thereof for establishing legal rights and limitations regarding the use of electronically distributed intellectual property (e.g., a "digital rights framework"). The digital rights framework provides a method and system for processing information encoded in a standardized and extensible format for modeling and representing the legal rights, limitations and responsibilities for intellectual properties distributed, for example, over the World Wide Web using Internet Protocol.

In the present embodiment, the intellectual property is modeled and offered for different types of distribution (e.g., for sale, rent, etc.). In response to a request for access to and use of the intellectual property, the legal rights and limitations associated with the type of distribution requested are provided. An agreement to these legal rights and limitations is reached and executed, and stored for subsequent reference and use.

In the present embodiment of the present invention, for each intellectual property, the legal rights and limitations associated with each particular type of distribution (e.g., sale, rent, etc.) are stored. Information identifying an individual or party with a legal interest in the intellectual property is also stored. The relationships of the individual or party to the intellectual property, to each other, and to the legal rights and limitations are established. In one embodiment, a hypertext reference can be used to invoke the legal rights and limitations associated with the type of distribution.

In one embodiment, proposed terms and conditions for the distribution are compared to a standard set of terms and conditions, and any deviations are Identified. The deviations can then be reviewed by, for example, a human user.

In one embodiment, the intellectual property is modeled and codified using XML (Extensible Markup Language).

The present invention thus provides a method and system thereof for declaring rights to an intellectual property and for granting those rights to a purchaser or licensee, in order to more effectively protect the property rights of the intellectual property owner.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "offering," "receiving," "providing," "establishing," "specifying," "using," "identifying," "describing" or the like, refer to actions and processes (e.g., processes 400 and 500 of FIGS. 4 and 5, respectively) of a computer system or similar electronic computing device. The computer system or similar electronic computing device manipulates and transforms data represented as physical (electronic) quantities within the computer system memories, registers or other such Information storage, transmission or display devices. The present invention is well suited to the use of other computer systems.

Figure 1A:
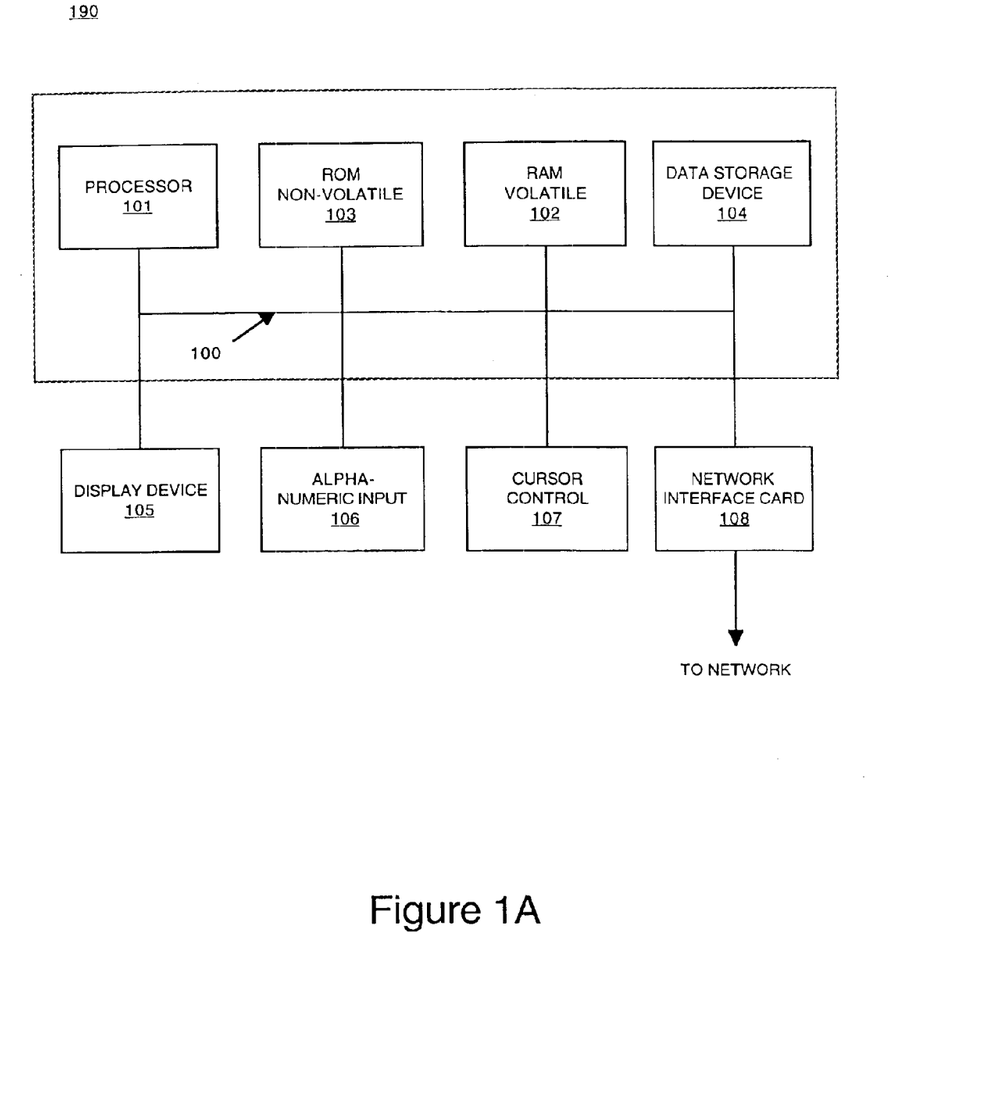
FIG. 1A is a block diagram of an exemplary computer system upon which embodiments of the present invention may be practiced.

Refer now to FIG. 1A which illustrates an exemplary computer system 190 upon which embodiments of the present invention may be practiced. In general, computer system 190 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 1B:
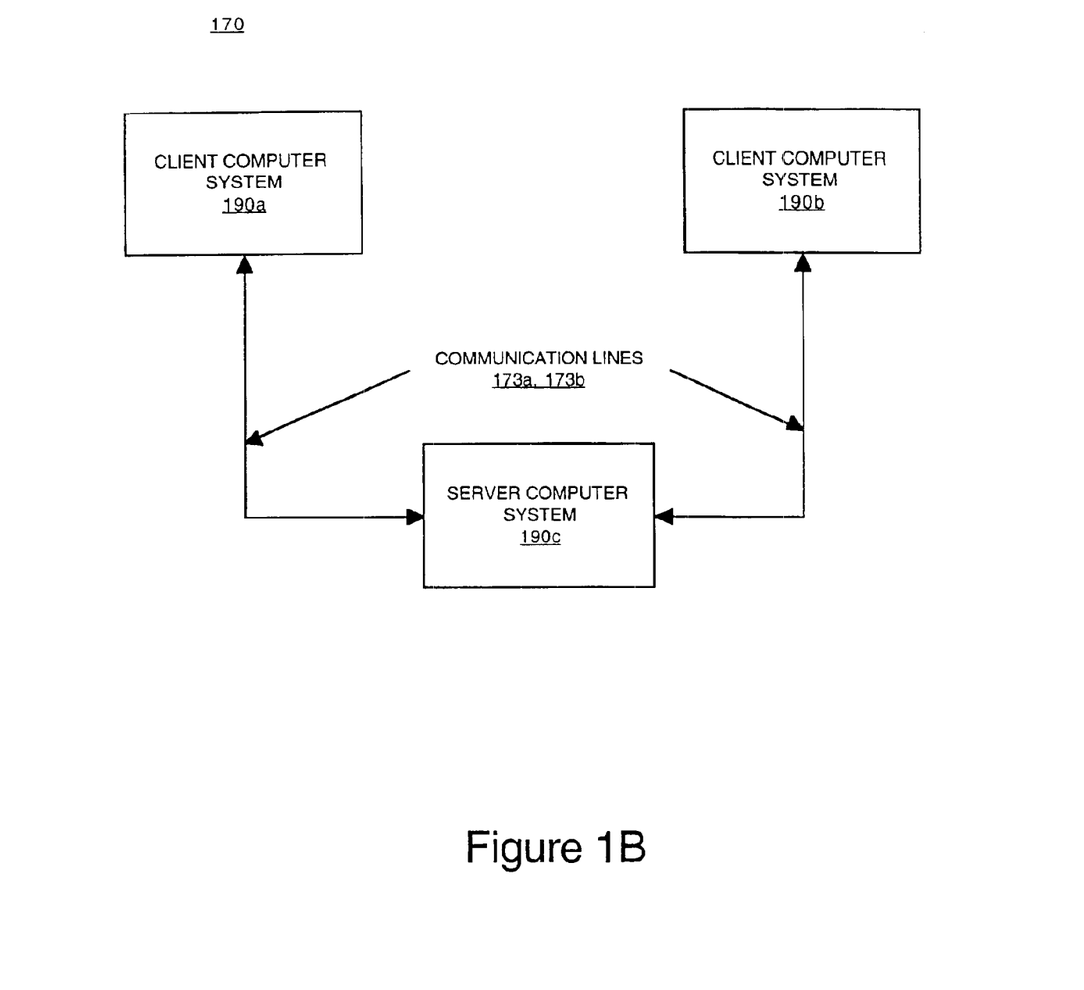
FIG. 1B is a block diagram illustrating an exemplary client-server computer system network upon which embodiments of the present invention may be practiced.

FIG. 1B is a block diagram illustrating an exemplary client-server computer system network 170 ("network 170") upon which embodiments of the present invention may be practiced. Network 170 may be a communication network located within a firewall of an organization, or corporation (an "Intranet"), or network 170 may represent a portion of the World Wide Web or Internet. Client (or user) computer systems 190a and 190b and server computer system 190c are communicatively coupled via communication lines 173a and 173b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer system 190c via an input/output port (e.g., a serial port) of server computer system 190c; that is, client computer systems 190a and 190b and server computer system 190c may be non-networked devices. It is appreciated that, for simplicity, only two client computer systems and a single server computer system are shown; however, it is understood that network 170 may comprise any number of client computer systems and server computer systems.

Figure 2:
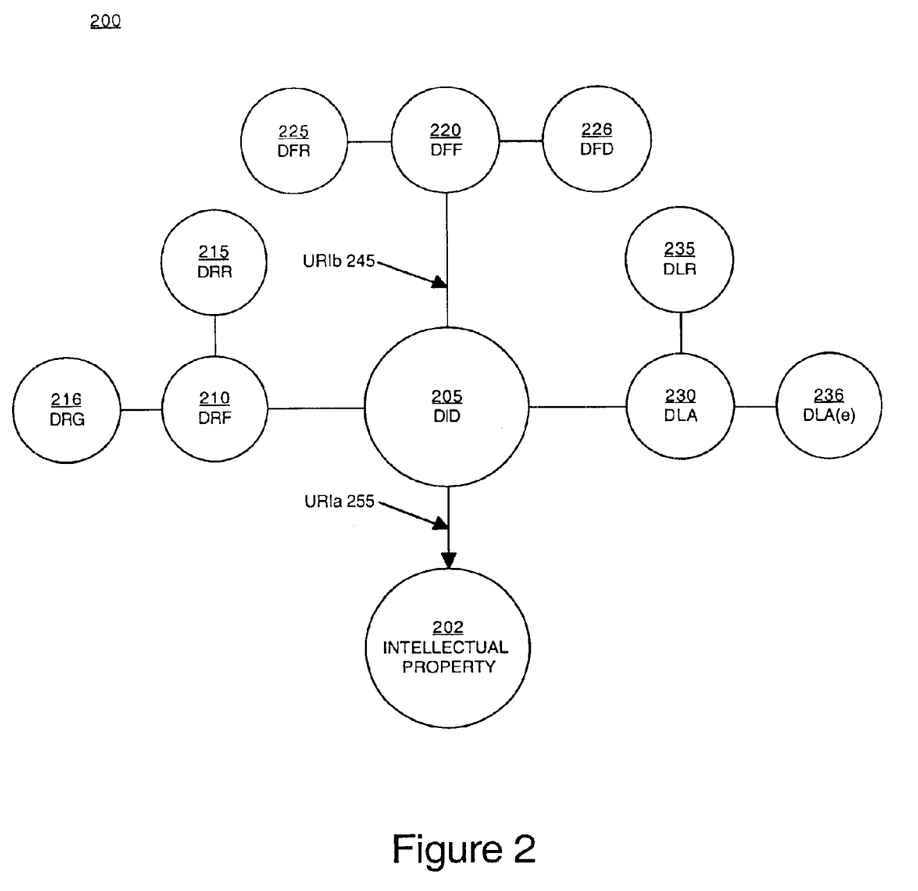
FIG. 2 shows the framework of an intellectual property management system in accordance with one embodiment of the present invention.

FIG. 2 shows the framework of an intellectual property management system 200 in accordance with one embodiment of the present invention. Intellectual property management system 200 can be implemented over the Internet (e.g., World Wide Web), over an Intranet, or using non-networked devices that are communicatively linked. Intellectual property management system 200 provides a system and method thereof for controlling the identification, negotiation, establishment, and transaction of intellectual properties (embodiments and representations) over the Internet. Additional information is provided in the copending patent application filed concurrently herewith, assigned to the assignee of the present invention, entitled "Intellectual Property Over Internet Protocol Framework," by Peter Corless, with Ser. No. 09/568,647, hereby incorporated by reference. The reference application provides the framework, referred to as the "IP over IP" framework, for facilitating the legal and commercial aspects of intellectual property transactions.

Intellectual property 202 can be either a representation or an embodiment of an intellectual property. In accordance with the present embodiment of the present invention, intellectual property 202 is assigned a unique digital identifier (DID) 205, which serves as a Uniform Resource Identifier (e.g., URIa 255) that points to intellectual property 202.

An electronic link or hyperlink is enabled between DID 205 and other intellectual property elements in order to establish the terms and conditions for accessing, using and distributing intellectual property 202. In one embodiment, different URIs (exemplified by URIb 245) may be used to point to these other intellectual property elements.

Digital feature format (DFF) 220 is an intellectual property element for describing the features of intellectual property 202. Digital feature request (DFR) 225 describes a query made with regard to these features. DFR 225 can also describe a request to add or remove a feature of intellectual property 202. Digital feature description (DFD) 226 describes the actual product features in response to the query, or modified features in response to a request for a change in features.

Digital license agreement (DLA) 230 is an intellectual property element describing a licensing agreement for intellectual property 202. Digital license request (DLR) 235 describes a request made for a digital license, and DLA(e) 236 describes the actual digital license agreement made between the intellectual property owner and a licensee.

In the present embodiment, digital rights framework (DRF) 210 is an intellectual property element for describing the rights granted by the intellectual property owner with regard to intellectual property 202. Digital rights request (DRR) 215 describes a request made to the owner for access to intellectual property 202 and for other rights associated with the property. Digital rights grant (DRG) 216 describes the rights granted by the owner of intellectual property 202. DRF 210 allows for the modeling, assertion, interrogation and response, storage and transport of information regarding the rights, limitation of rights, responsibilities and other terms and conditions of use or service for intellectual properties (embodiments or representations).

In accordance with the present embodiment of the present invention, DRF 210 includes a standard and extensible model, and systems and processes to create, store, query and maintain models of intellectual properties (or representations). DRF 210 also includes, but is not limited to, the declaration or assertion of names and identifiers of the property, and specific rights and attributes, such as copyright, trademark, patent, privacy, secrecy, and confidentiality statements.

In the present embodiment, DRF 210 also includes a standard and extensible model, and systems and processes to create, store, query and maintain models to associate governmental or private or public legal and territorial rights and responsibilities for internal and extra-jurisdictional controls such as import or export restrictions, registration, taxation, or duties requirements.

In the present embodiment, DRF 210 also includes a standard and extensible model, and systems and processes to create, store, query and maintain models of rights and assertions of rights and to enable transactions for intellectual properties or representations based on accepted legal frameworks and protocols. This includes representation and embodiment of various commercial and non-commercial statutes and dispositions of intellectual property, and transactions to request and change statuses and dispositions. Such models can include rights of creation and initial assertion of rights, assignments and transfers, licensing, terms of commercial sale and contract, terms of service and use, warranties, and various other status and transactional declarations. The present invention shall be extensible to cover and uphold any forms of U.S. and international intellectual property law, including but not limited to copyright, trademark, patent or trade secret transactions. It shall also strive to comply, where possible, with key laws covering computer information exchanges, such as the Uniform Computer Information Transactions Act of 1999 (approved and recommended by the National Conference of Commissioners of Uniform State Laws).

In the present embodiment, DRF 210 further includes a standard and extensible model, and systems and processes to create, store, query and maintain models of legally interested parties in an intellectual property or representation, including creators, owners, beneficiaries, fiducially interested parties, agents, users, licensees, sellers and resellers, purchasers or buyers, regulating or administrative bodies, offices or jurisdictions such as governments, consortia, or business entities, private or public certifiers, and so on.

Continuing with reference to FIG. 2, in the present embodiment, DRF 210 also includes a standard and extensible method to create relationships of one or more parties involved in an intellectual property, and to make a declaration or assertion of specific interest or relationship in an intellectual property or representation, based on: a) the model of the property; b) the model of rights associated with the property; c) the model of the parties; and d) the model of the terms of the agreement between the parties.

In the present embodiment, DRF 210 also includes a model of explicit or implicit commercial or non-commercial offers of intellectual property rights distribution, transfer or assignment, such as via sale, rent, lease, contract, warranty, evaluation, grant, gift, award, license and so on. For a modeled property (or class of properties), an explicit offer model can be stored for future query and transaction. For example, a product or service might be available for sale, lease or rent, and for each of these, the associated list of applicable rights can be invoked through relationships via hypertext references.

The present embodiment of DRF 210 also includes methods to test assertions and declarations and hold them as valid. This includes the checking of the formation, encoding and encapsulation of the representation and embodiment of a digital rights framework message sent over a TCP/IP network (e.g., network 170 of FIG. 1B), as well as a semiotic analysis of the semantic, schematic, and syntactic content of the message against related models, examples, and algorithms.

For each application of this framework, different pragmatic purposes of the content and applications which process such statements can be declared or intuitively understood. For example, a copyright holder would wish to make a DRF statement to assert their explicit ownership of a work of art. Another system, compliant to DRF 210, might analyze and store copyright statements of various DRF declarations, parse them, and sort them for each search and referral by those searching for copyrights held by a particular entity. This same expression could be used to file the copyright with a governmental body over the Internet, and to mark the work of art itself. Different elements of the same DRF declaration may therefore have very different pragmatic and useful purposes.

Continuing with reference to FIG. 2, in the present embodiment, DRF 210 further includes methods to state what a specific right entitles a party to do with the intellectual property, or what obligations they are under through the specific rights grant. Such entitlements might include rights to transfer, share or assign the right to others, entitlement scope in temporal or territorial terms, rights to use, alter, destroy, incorporate in other properties, rights to hold, distribute, store or return, and so on.

In the present embodiment, DRF 210 also includes a method to relate all models of digital rights elements and attributes (e.g., properties, parties, terms and conditions, rights and agreements) with all directly-related specific instantiations of the intellectual property; for instance, the ability to link a model of a property's elements to all properties which Include those elements.

In the present embodiment, DRF 210 includes methods to make representations and embodiments of rights requests and responses (e.g., DRR 215), and declaration or assertions of rights grants (e.g., DRG 216). This includes systems to create, process, store and transport requests and responses for intellectual property rights.

In the present embodiment, DRF 210 is implemented using a standard and extensible method of encoding, encapsulating, storing and transporting models using Internet Protocol, or using computerized methods which provide a gateway to or from the Internet Protocol. The models, intellectual property (embodiments and representations), and control messages are represented in XML, or in systems of encoding or markup using various mechanisms (e.g., application program Interfaces) which can be converted into or from XML.

In the present embodiment, DRF 210 can also include computerized controls and systems which interpret and operate based on the content of digital rights framework or digital rights request messages. For example, an Internet firewall might receive a message which is a request to open a port based upon the assertion of the purchase of a "right of way" embodied in a digital rights framework message. After the validity of the message is checked and confirmed, access controls for the Internet firewall might be changed to allow the requesting party to pass through.

Figure 3:
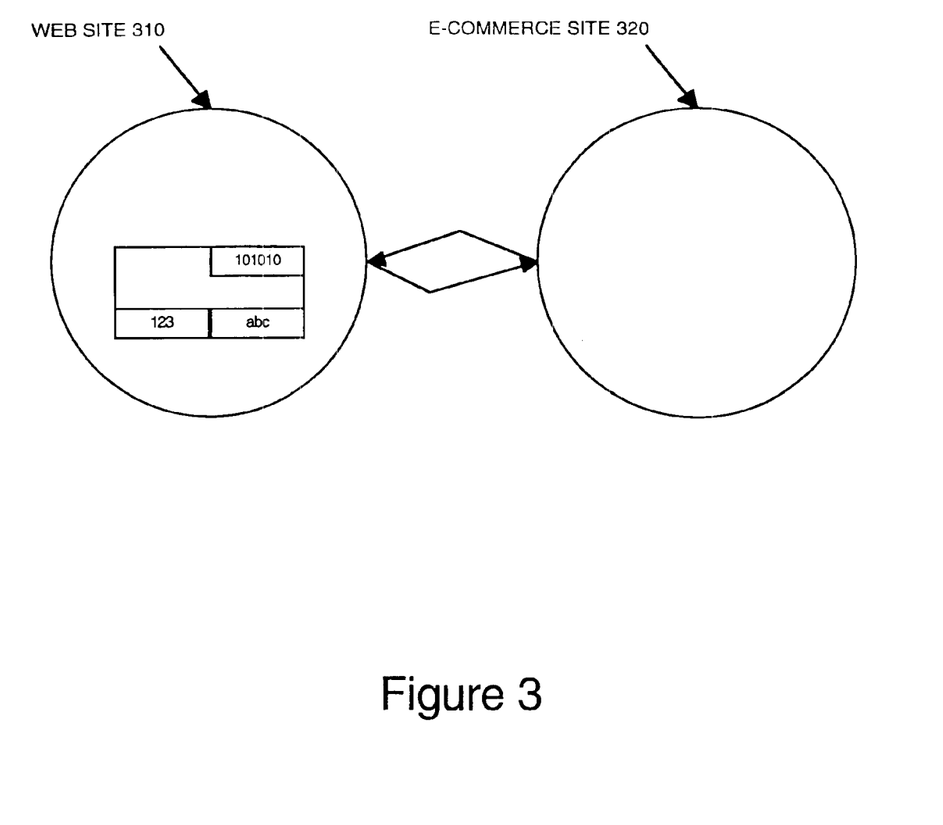
FIG. 3 is diagram exemplifying an interface between Internet sites in accordance with one embodiment of the present invention.

FIG. 3 is diagram exemplifying the interface between World Wide Web ("Web") site 310 and electronic commerce ("e-commerce") site 320 in accordance with one embodiment of the present invention. It is appreciated that, in a similar manner, this interface can occur over an Intranet or using non-networked devices that are communicatively linked.

In the present embodiment, Web site 310 includes content (e.g., intellectual property 202 of FIG. 2) that is available for sale, license, rent, etc. In one embodiment, Web site 310 and its content (including intellectual property 202) are codified using XML (Extensible Markup Language). In one embodiment, the features of intellectual property 202 are described by DFD 226 (FIG. 2).

Continuing with reference to FIG. 3, in the present embodiment, e-commerce site 320 is communicatively coupled to Web site 310 according to Internet Protocol. The content of e-commerce site 320 includes various intellectual properties for sale, rent, etc., each property perhaps described by text or accompanied by its picture. In one embodiment, e-commerce site 320 and its content are codified using XML.

In accordance with the present embodiment of the present invention, with reference to FIGS. 2 and 3, the interface between Web site 310 and e-commerce site 320 is accomplished using intellectual property management system 200. As described above, in one embodiment, the content of Web site 310 is described by an intellectual property element such as DFF 220 (specifically, DFD 226). The owner of the content of Web site 310 grants rights and spells out limitations to the seller or licensee responsible for e-commerce site 320. In one embodiment, the rights and limitations associated with intellectual property 202 are described by an intellectual property element such as DRF 210 (specifically, DRG 216). In one embodiment, these rights and limitations are instead provided by a license described by an intellectual property element such as DLA 230 (specifically, DLA(e) 236).

Provided below is an example of a digital license request (e.g., DLR 235) codified in XML in accordance with one embodiment of the present invention.

```
<LICENSEREQUESTS>
<DLR Type="StandardLicense">
    <Authorization Type="PSE" TimeIssued="DD-MMM-YYYY">
        <PSE>
            <SalesOrder SalesOrderNumber="NNNNNNN"
            SalesOrderDate="DD-MMM-YYYY"/>
            <PurchaseOrder PurchaseOrderNumber="AAAAA"
            PurchaseOrderDate="DD-MMM-YYYY"/>
            <DLA Type="EULA"/>
            <Order Type="Standard-NL"/>
        <PSE>
    </Authorization>
    <RequestingSystem>
        <HostName>[Host Name]</HostName>
        <ServerName>[Server Name]</ServerName>
        <Location>[Location]</Location>
    </RequestingSystem>
    <RequestingUser>
        <OrganizationName>ERP</OrganizationName>
        <UserName>[User Name]</UserName>
        <ContactEmailAddress>[Address]</ContactEmailAddress>
    </RequestingUser>
    <Product SubGroup="SCAN-PAK">
        <LineId>nnnnnnn</LineId>
        <LineNumber>1</LineNumber>
        <InventoryItemId>mmmmmmm</InventoryItemId>
        <ProductName>SW-WC1.0</ProductName>
        <ProductDescription>WebClient user license
        (initial minimum order)</ProductDescription>
        <OrderedQuantity>1</OrderedQuantity>
        <Licensee>
            <SiteContact/>
            <OrganizationName>[Name]</OrganizationName>
            <Address>
                <StreetAddress>
                    <Line>
                </StreetAddress>
                <City/>
                <State/>
                <Province/>
                <Country/>
            </Address>
        </Licensee>
        <Intermediary>
            <SiteContact>[Name]</SiteContact>
            <OrganizationName>[Name]</OrganizationName>
            <Address>
                <StreetAddress>
                    <Line>
                </StreetAddress>
                <City/>
                <State/>
                <Province/>
                <Zip/>
                <Country/>
            </Address>
        </Intermediary>
        <LicenseRequested>
            <PakParams/>
            <NumberOfLicenses>500</NumberOfLicenses>
            <LicenseParams/>
            <HostOS/>
```

-continued

```
            <HostName>[Name]</HostName>
            <HostId>nmnmnmn</HostId>
            <Pak/>
        </LicenseRequested>
        <LicenseDispatch>
            <EmailAddress>[Address]</EmailAddress>
            <OutboundDir/>
        </LicenseDispatch>
    </Product>
</DLR>
</LICENSEREQUESTS>
```

Provided below is an example of a digital license agreement (e.g., DLA(e) 236) codified in XML in accordance with one embodiment of the present invention.

```
<DLA version="1.0">
    <License Type="[EULA/ILA]"
        Description="[End User License Agreement|Intermediary
        License Agreement]"
        DLANumber=[DLANumber]">
        <Authorization Type="PSE" Description="Product Sales
        Entitlement" TimeIssued="DD-MMM-YYYY">
            <PSE>
                <SalesOrder SONumber=""SODate=""/>
                <PurchaseOrder PONumber=""PODate+""/>
                <Order Type="[Resale|Internal]"/>
            </PSE>
        </Authorization>
        <Agreement>
            <Licensor>
            </Licensor>
            <Intermediary>
            </Intermediary>
            <Licensee>
            </Licensee>
        </Agreement>
        <TermsAndConditions>
            <LicensePeriod Type="[Perpetual|Limited]">
                <StartDate>[YYYY-MM-DDTHH:MM-GGGG]</StartDate>
                <TerminalDate>[YYYY-MM-
                DDTHH:MM-GGGG]</TerminalDate>
            </LicensePeriod>
        </TermsAndConditions>
        <ProductList>
            <Product ProductLineNo=""ProductName=
            ""ProductDesc""ProductQty=""ProductLicenseID="">
            </Product>
            <Product ProductLineNo=""ProductName=
            ""ProductDesc""ProductQty=""ProductLicenseID="">
                <ProductOrderAttributes>
                    <PakParams>         </PakParams>
                    <LicenseBlocks>[CSV numerical values]</LicenseBlocks>
                    <LicenseParams>     </LicenseParams>
                    <HostOS>            </HostOS>
                    <HostName>          </HostName>
                    <HostID>            </HostID>
                    <ChassisID>         </ChassisID>
                    <Pak>               </Pak>
                </ProductOrderAttributes>
            </Product>
        </ProductList>
        <LicenseKeyList>
            <LicenseKey ProductLicenseID="">
            <LicenseKeyDescription>[License Key
            Description</LicenseKeyDescription>
            <LicenseKeyValue>[License Key Value]</LicenseKeyValue>
            <LicenseKeyHref="[URI]">[Description
            of URI]</LicenseKeyHref>
        </LicenseKeyList>
        <InstallationInstructions ProductLicenseID="">
            <TextInstructionBlock>
```

-continued

```
    </TextInstructionBlock>
   </InstallationInstructions>
  </License>
</DLA>
```

Regarding the example DLA codified above, the authorization key may be a public key, a digital certificate, or some other form of authentication. The "PSE" (Product Sales Entitlement) block represents the digital rights grant (e.g., DRG 216 of FIG. 2). The "intermediary" block is used in cases of an Intermediary License Agreement or a channel-delivered EULA (End User License Agreement). In the "terms and conditions" block, legal terms of the agreement are included and can be an ASCII text block, HTML (Hypertext Markup Language) or XML formatted text, or an external reference via URI to other local or remote documents. The terms and conditions are included for the elements listed in the "product list" block. The product list can be reiterated from the DLR. The products can include a list of character-data license key values, an internal pointer or reference to key data held elsewhere, or an external pointer to an associated file which contains license-related data. The "product license ID" attribute is a local file reference to the "license key" element.

Figure 4:
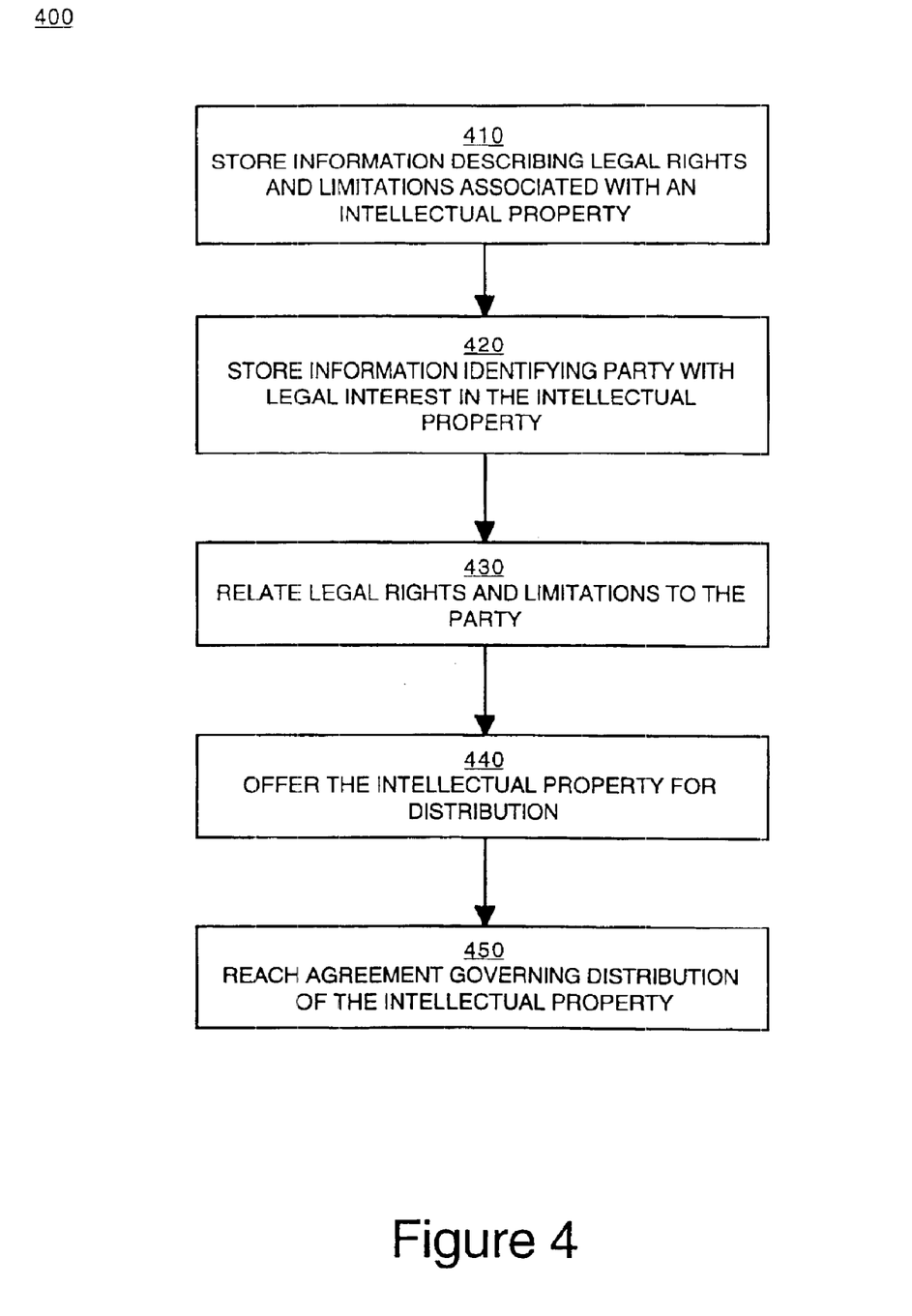
FIG. 4 is a flowchart of the steps in a process for establishing legal rights and limitations for using electronically distributed intellectual property in accordance with one embodiment of the present invention.

FIG. 4 is a flowchart of the steps in a process 400 for establishing legal rights and limitations for using electronically distributed intellectual property in accordance with one embodiment of the present invention. In accordance with the present embodiment of the present invention, process 400 embodies DRF 210 of FIG. 2. Process 400 can be implemented via computer-readable program instructions stored in a memory unit (e.g., random access memory 102, read-only memory 103, and/or data storage device 104) and executed by processor 101 of computer system 190 (FIG. 1A). In one embodiment, process 400 is implemented via a client-server computer system network (e.g., network 170 of FIG. 1B). In the present embodiment, process 400 (e.g., the digital rights framework) is implemented using XML, or using a system of encoding or markup which can be converted into or converted from XML.

In step 410 of FIG. 4, a model of an intellectual property (or a representation of the property) is created and stored. In the present embodiment, the model includes (but is not limited to) the declaration or assertion of a name or an identifier for the property, and attributes of the property such as copyright, trademark, patent, privacy, secrecy and confidentiality statements. Associated with the intellectual property (e.g., by hypertext reference) are governmental or private or public legal and territorial rights and responsibilities for internal and extra-jurisdictional controls such as import or export restrictions, registration, taxation or duties requirements, etc. Also associated with the intellectual property (e.g., by hypertext reference) are rights and assertion of rights, and also including assignments and transfers, licensing, terms of commercial sale and contract, terms of service and use, warranties, and various other status and transactional declarations.

In step 420, a model of the legally interested parties in the intellectual property, including creators, owners, beneficiaries, fiducially interested parties, agents, users, licensees, sellers and resellers, purchasers or buyers, regulating or administrative bodies, offices or jurisdictions such as governments, consortia, or business entities, private or public certifiers, and so on, is created and stored.

In step 430, relationships between the legally interested parties are created, and the specific interest or relationship of the parties to the intellectual property is asserted (e.g., by hypertext references). That is, the relationships of the individual or party to the intellectual property, to each other, and to the legal rights and limitations are established.

In step 440, a commercial or non-commercial offer of the intellectual property, with associated rights and limitations, is made. In one embodiment, the offer is made over the Internet (e.g., via Web site 310 of FIG. 3). For example, the property may be available for sale, lease or rent. For each of these types of distribution, in one embodiment, the associated list of applicable rights can be invoked through hypertext references.

In step 450, an agreement (e.g., a digital rights grant) is reached with a user, purchaser or licensee to purchase, rent, lease, etc., the intellectual property. Assertions and declarations in the agreement can be tested for validity. For example, proposed terms and conditions can be matched against a standard set of terms and conditions, so that deviations can be identified for review and approval. Because these exist electronically (digitally), the comparison can be performed in software or in a hardware computation, and the results of the comparison can be provided if necessary to a human user for review. In addition, changes to law or business policies or agreements can be reflected by updates to or reconfigurations of the modules within the system, enabling much easier compliance to legal and fiscal standards and practices.

Figure 5:
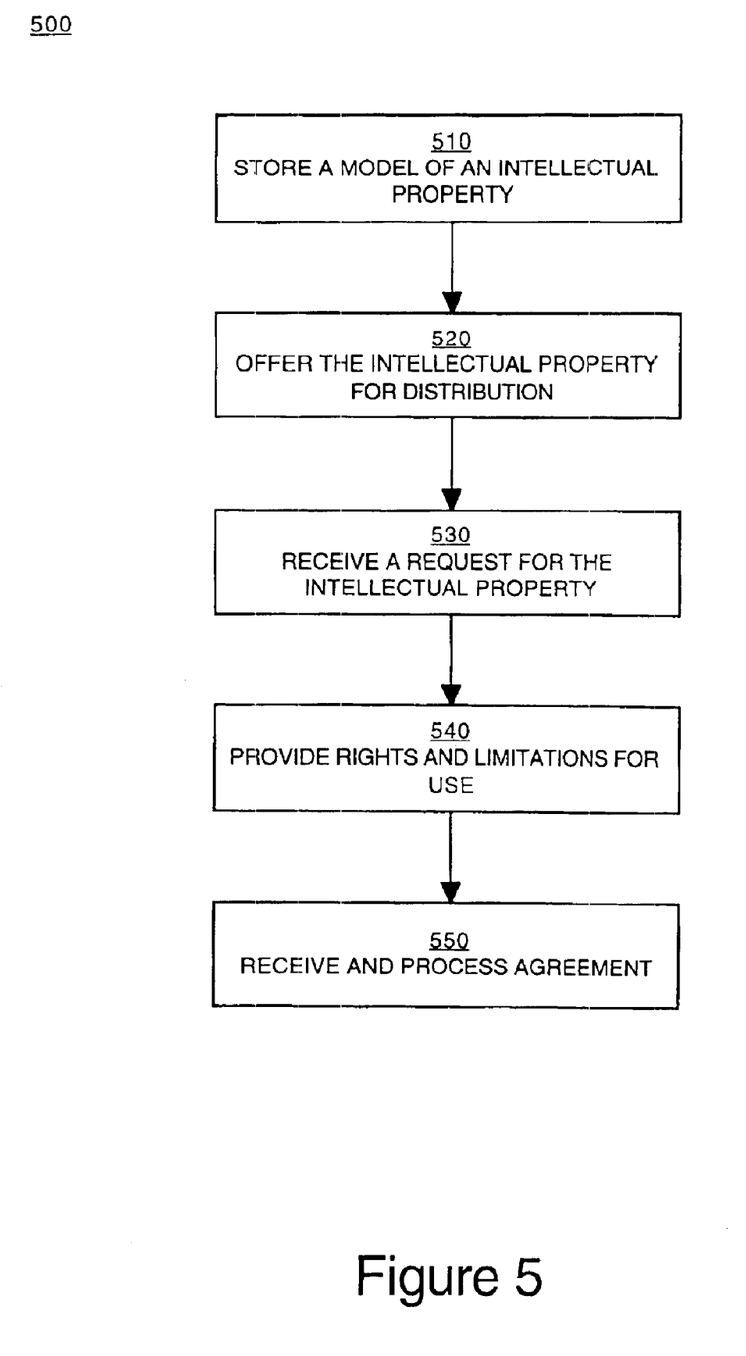
FIG. 5 is a flowchart of the steps in a process for executing a transaction of intellectual property in accordance with one embodiment of the present invention.

FIG. 5 is a flowchart of the steps in a process 500 for executing a transaction of intellectual property in accordance with one embodiment of the present invention. In accordance with the present embodiment of the present invention, process 500 exemplifies an application of process 400 (FIG. 4). Process 500 can be implemented via computer-readable program instructions stored in a memory unit (e.g., random access memory 102, read-only memory 103, and/or data storage device 104) and executed by processor 101 of computer system 190 (FIG. 1A). In one embodiment, process 500 is implemented via a client-server computer system network (e.g., network 170 of FIG. 1B). In the present embodiment, process 500 is implemented using XML, or using a system of encoding or markup which can be converted into or converted from XML.

In step 510 of FIG. 5, with reference also to FIGS. 2 and 3, an intellectual property (e.g., intellectual property 202) is modeled and stored using Web site 310 (as described by steps 410, 420 and 430 of FIG. 4). A representation of intellectual property 202 is identified using DID 205, so that queries can be made with regard to the features, rights, requests and responses associated with the property.

In step 520, using Web site 310, intellectual property 202 is published as being offered for sale, rent, lease, etc. Refer also to step 440 of FIG. 4.

In step 530, using Internet Protocol, Web site 310 receives a request (e.g., DRR 215 or DLR 235) from e-commerce site 320 regarding certain types of intellectual properties (perhaps software of for a particular application). Web site 310 responds with a list of relevant intellectual properties using their DIDs or through an XML message containing digital feature format documents (e.g., DFD 226) for the properties.

In step 540, Web site 310, perhaps in response to a further request from e-commerce site 320 or perhaps without prompting, describes the types of distribution that may be made (e.g., sale, rent, or lease). Web site 310 also can provide the terms and conditions (e.g., DRG 216 or DLA(e) 236) with regard to the sale, rent, license, etc., of the intellectual properties (or for one particular intellectual property selected by e-commerce site 320). E-commerce site 320 can review these terms and conditions and, in one embodiment, can provide them to a human user for approval. In another embodiment, the human user may have assigned an agent which has stored standard legal terms and conditions, business practices and procedural logic to act on the human user's behalf in compliance with the user's preferences. As long as the response complies with the stored processes and logic, the computer agent may conduct certain levels of standard business for the human agent.

As described previously, terms and conditions can be negotiated by comparing proposed terms and conditions against a standard set of terms and conditions. Any deviations can be identified, and if necessary provided to a human user for review and approval, or to a different "IP over IP" framework-compliant system with greater logical processing capabilities.

In step 550, upon approval, the agreement is returned to Web site 310 and the commercial transfer of the intellectual property is accomplished over the Internet via Internet Protocol. The agreement can also be stored electronically for further processing or for reference.

The present embodiment of the present invention thus provides a method and system thereof for establishing legal rights and limitations regarding the use of electronically distributed intellectual property (e.g., a "digital rights framework"). The digital rights framework provides a method and system for processing information encoded in a standardized and extensible format for modeling and representing the legal rights, limitations and responsibilities for intellectual properties distributed, for example, over the World Wide Web using Internet Protocol. Furthermore, the present invention provides a method and system for granting those rights to a purchaser or licensee, in order to more effectively protect the property rights of the intellectual property owner.

In accordance with the present invention, all forms of intellectual property can use a common series of extensible languages (e.g., XML) and control systems to request and respond to requests for access, control, ownership, rights of use or reuse, etc., and to enable network and automatic computerized actions regarding the distribution of the intellectual property once the rights of access have been established and accepted. For example, the intellectual property management system of the present invention can be applied to the distribution of software over the Internet using Internet Protocol.

In addition to application in the software industry, the present invention can be extended to the telecommunications industry, which has embodiments and representations of rights of access or use of a network as well as intellectual properties such as pay-per-view movies and events. Similarly, the present invention can be extended to general content media properties, such as music or other audio, video and film, written literature, news, specialized data and information sources such as medical and financial records, and so on.

In summary, the present embodiment of the present invention provides a method and system thereof for modeling and asserting information regarding the rights, responsibilities and other terms of use of intellectual property within the "IP over IP" (intellectual property over Internet Protocol) framework. The present invention also allows interrogation of that information and responds to those interrogations. The present invention further allows for storage and transport of the information regarding the rights, responsibilities and other terms of use of intellectual property.

The preferred embodiment of the present invention, digital rights framework, is thus described. While the present invention has been described in particular embodiments, it should be appreciated that the present invention should not be construed as limited by such embodiments, but rather construed according to the following claims.

What is claimed is:

1. In a computer system network, a computer-implemented method for establishing legal rights and limitations for using electronically distributed intellectual property, said method comprising:

storing a model of said intellectual property in a memory unit of a computer system, wherein said intellectual property is assigned a unique digital identifier comprising a Uniform Resource Identifier (URI) that points to an instantiation of said intellectual property;

enabling executable links between said digital identifier and other URIs that point to intellectual property elements that describe characteristics of said intellectual property, said executable links pointing to said intellectual property elements and automatically accessing said intellectual property elements when executed, said intellectual property elements comprising at least one of a digital feature element that describes features of said intellectual property, a digital rights element that describes legal rights and limitations associated with said intellectual property and a digital license element that provides a license for said intellectual property;

offering said intellectual property for distribution;

receiving a request for access to and use of said intellectual property;

in response to said request, providing an electronic version of said legal rights and limitations according to descriptions in said intellectual property elements;

receiving agreement to said legal rights and limitations; and storing said agreement in a memory unit of a computer system.

2. The method for establishing legal rights and limitations for using electronically distributed intellectual property as recited in claim 1 wherein said storing said model further comprises:

storing information identifying an individual or party with a legal interest in said intellectual property; and establishing relationships between said intellectual property, said legal rights and limitations and said individual or party.

3. The method for establishing legal rights and limitations for using electronically distributed intellectual property as recited in claim 1 wherein said offering further comprises:

specifying legal rights and limitations associated with said distribution according to said descriptions in said intellectual property elements.

4. The method for establishing legal rights and limitations for using electronically distributed intellectual property as recited in claim 1 wherein said receiving said request further comprises:

receiving in said request a selection of a type of distribution to be made.

5. The method for establishing legal rights and limitations for using electronically distributed intellectual property as recited in claim 1 wherein said providing further comprises:

receiving proposed terms and conditions for said distribution;

identifying any deviations between said proposed terms and conditions and a standard for terms and conditions; and mitigating said deviations and errors.

6. The method for establishing legal rights and limitations for using electronically distributed intellectual property as recited in claim 1 wherein said providing further comprises:

describing entitlements provided by said legal rights and limitations associated with said distribution.

7. The method for establishing legal rights and limitations for using electronically distributed intellectual property as recited in claim 1 further comprising:

establishing relationships between common elements of a first intellectual property and a second intellectual property; and creating sets of intellectual properties sharing said common elements.

8. The method for establishing legal rights and limitations for using electronically distributed intellectual property as recited in claim 1 further comprising:

establishing relationships between common elements of a first distribution of said intellectual property and a second distribution of said intellectual property.

9. The method for establishing legal rights and limitations for using electronically distributed intellectual property as recited in claim 1 wherein said intellectual property is distributed using Internet Protocol.

10. The method for establishing legal rights and limitations for using electronically distributed intellectual property as recited in claim 1 wherein said intellectual property and said legal rights and limitations are modeled using XML (Extensible Markup Language).

11. A computer-implemented method for establishing legal rights and limitations regarding the use of electronically distributed intellectual property, said method comprising:

storing information describing said legal rights and limitations in a memory unit of a computer system, wherein said legal rights and limitations are particular to a type of distribution;

assigning to said intellectual property a unique digital identifier comprising a Uniform Resource Identifier (URI) that points to an instantiation of said intellectual property;

enabling an executable link between said digital identifier and another URI that points to an intellectual property element that describes said legal rights and limitations;

storing information identifying an individual or party with a legal interest in said intellectual property in a memory unit of a computer system;

establishing relationships between said intellectual property, said legal rights and limitations and said individual or party with another individual or party;

offering said intellectual property for distribution; and upon acceptance of an offer, reaching an agreement governing distribution of said intellectual property.

12. The method for establishing legal rights and limitations regarding the use of electronically distributed intellectual property as recited in claim 11 wherein said offering further comprises:

specifying legal rights and limitations associated with said distribution according to descriptions in said intellectual property element.

13. The method for establishing legal rights and limitations regarding the use of electronically distributed intellectual property as recited in claim 11 wherein said reaching an agreement further comprises:

receiving proposed terms and conditions for said distribution;

identifying any deviations between said proposed terms and conditions and a standard for terms and conditions; and mitigating said deviations and errors.

14. The method for establishing legal rights and limitations regarding the use of electronically distributed intellectual property as recited in claim 11 further comprising:

describing entitlements provided by said legal rights and limitations associated with said distribution.

15. The method for establishing legal rights and limitations regarding the, use of electronically distributed intellectual property as recited in claim 11 further comprising:

establishing relationships between common elements of a first intellectual property and a second intellectual property; and creating sets of intellectual properties sharing said common elements.

16. The method for establishing legal rights and limitations regarding the use of electronically distributed intellectual property as recited in claim 11 further comprising:

establishing relationships between common elements of a first distribution of said intellectual property and a second distribution of said intellectual property.

17. The method for establishing legal rights and limitations regarding the use of electronically distributed intellectual property as recited in claim 11 wherein said intellectual property is distributed using Internet Protocol.

18. The method for establishing legal rights and limitations regarding the use of electronically distributed intellectual property as recited in claim 11 wherein said intellectual property and said legal rights and limitations are modeled using XML (Extensible Markup Language).

19. A computer system comprising:

a bus;

a processor coupled to said bus; and a memory unit coupled to said bus, said memory unit containing instructions that when executed implement a computer-implemented method for establishing legal rights and limitations regarding the use of electronically distributed intellectual property, said method comprising:

storing a model of said intellectual property in said memory unit, wherein said intellectual property is assigned a unique digital identifier comprising a Uniform Resource Identifier (URI) that points to an instantiation of said intellectual property;

enabling executable links between said digital identifier and other URIs that point to intellectual property elements that describe characteristics of said intellectual property said executable links pointing to said intellectual property elements and automatically accessing said intellectual property elements when executed, said intellectual property elements comprising at least one of a digital feature element that describes features of said intellectual property, a digital rights element that describes legal rights and limitations associated with said intellectual property and a digital license element that provides a license for said intellectual property;

offering said intellectual property for distribution;

receiving a request for access to and use of said intellectual property;

in response to said request, providing an electronic version of said legal rights and limitations according to descriptions in said intellectual property elements;

receiving agreement to said legal rights and limitations; and storing said agreement in said memory unit.

20. The computer system of claim 19 wherein said processor performs said method for establishing legal rights and limitations regarding the use of electronically distributed intellectual property wherein said storing said model further comprises:

storing information identifying an individual or party with a legal interest in said intellectual property; and establishing relationships between said intellectual property, said legal rights and limitations and said individual or party.

21. The computer system of claim 19 wherein said processor performs said method for establishing legal rights and limitations regarding the use of electronically distributed intellectual property wherein said offering further comprises:

specifying legal rights and limitations associated with said distribution according to said descriptions in said intellectual property elements.

22. The computer system of claim 19 wherein said processor performs said method for establishing legal rights and limitations regarding the use of electronically distributed intellectual property wherein said receiving said request further comprises:

receiving in said request a selection of a type of distribution to be made.

23. The computer system of claim 19 wherein said processor performs said method for establishing legal rights and limitations regarding the use of electronically distributed intellectual property wherein said providing further comprises:

receiving proposed terms and conditions for said distribution;

identifying any deviations between said proposed terms and conditions and a standard for terms and conditions; and mitigating said deviations and errors.

24. The computer system of claim 19 wherein said processor performs said method for establishing legal rights and limitations regarding the use of electronically distributed intellectual property wherein said providing further comprises:

describing entitlements provided by said legal rights and limitations associated with said distribution.

25. The computer system of claim 19 wherein said processor performs said method for establishing legal rights and limitations regarding the use of electronically distributed intellectual property further comprising:

establishing relationships between common elements of a first intellectual property and a second intellectual property; and creating sets of intellectual properties sharing said common elements.

26. The computer system of claim 19 wherein said processor performs said method for establishing legal rights and limitations regarding the use of electronically distributed intellectual property further comprising:

establishing relationships between common elements of a first distribution of said intellectual property and a second distribution of said intellectual property.

27. The computer system of claim 19 wherein said intellectual property is distributed using Internet Protocol.

28. The computer system of claim 19 wherein said intellectual property and said legal rights and limitations are modeled using XML (Extensible Markup Language).

29. A computer-usable medium having computer-readable program code embodied therein for causing a computer system to perform a method for controlling intellectual properties, said method comprising:

storing a model of said intellectual property in a memory unit of a computer system, wherein said intellectual property is assigned a unique digital identifier comprising a Uniform Resource Identifier (URI) that points to an instantiation of said intellectual property;

enabling executable links between said digital identifier and other URIs that point to intellectual property elements that describe characteristics of said intellectual property, said executable links pointing to said intellectual property elements and automatically accessing said intellectual property elements when executed, said intellectual property elements comprising at least one of a digital feature element that describes features of said intellectual property, a digital rights element that describes legal rights and limitations associated with said intellectual property and a digital license element that provides a license for said intellectual property;

offering said intellectual property for distribution;

receiving a request for access to and use of said intellectual property;

in response to said request, providing an electronic version of said legal rights and limitations according to descriptions in said intellectual property elements;

receiving agreement to said legal rights and limitations; and storing said agreement in a memory unit of a computer system.

30. The computer-usable medium of claim 29 wherein said computer-readable program code embodied therein causes a computer system to perform said method comprising:

storing information identifying an individual or party with a legal interest in said intellectual property; and establishing relationships between said intellectual property, said legal rights and limitations and said individual or party.

31. The computer-usable medium of claim 29 wherein said computer-readable program code embodied therein causes a computer system to perform said method comprising the step of:

specifying legal rights and limitations associated with said distribution according to said descriptions in said intellectual property elements.

32. The computer-usable medium of claim 29 wherein said computer-readable program code embodied therein causes a computer system to perform said method comprising:

receiving in said request a selection of a type of distribution to be made.

33. The computer-usable medium of claim 29 wherein said computer-readable program code embodied therein causes a computer system to perform said method comprising:

receiving proposed terms and conditions for said distribution;

identifying any deviations between said proposed terms and conditions and a standard for terms and conditions; and mitigating said deviations and errors.

34. The computer-usable medium of claim 29 wherein said computer-readable program code embodied therein causes a computer system to perform said method comprising:

describing entitlements provided by said legal rights and limitations associated with said distribution.

35. The computer-usable medium of claim 29 wherein said computer-readable program code embodied therein causes a computer system to perform said method comprising:

establishing relationships between common elements of a first intellectual property and a second intellectual property; and creating sets of intellectual properties sharing said common elements.

36. The computer-usable medium of claim 29 wherein said computer-readable program code embodied therein causes a computer system to perform said method comprising:

establishing relationships between common elements of a first distribution of said intellectual property and a second distribution of said intellectual property.

* * * * *